US012332950B2

(12) United States Patent
Chung et al.

(10) Patent No.: US 12,332,950 B2
(45) Date of Patent: Jun. 17, 2025

(54) APPARATUS AND METHOD FOR PROVIDING SEARCH SERVICE IN ASSOCIATION WITH CHATROOM OF MESSENGER APPLICATION

(71) Applicants: LY Corporation, Tokyo (JP); NAVER Corporation, Seongnam-si (KR)

(72) Inventors: Grace Minjoo Chung, Seongnam-si (KR); Bohye Kim, Seongnam-si (KR); Maria Park, Seongnam-si (KR); Jae Gwang Lee, Seongnam-si (KR); Ji Yong Kim, Seongnam-si (KR)

(73) Assignees: LY Corporation, Tokyo (JP); NAVER Corporation, Seongnam-si (KR)

( * ) Notice: Subject to any disclaimer, the term of this patent is extended or adjusted under 35 U.S.C. 154(b) by 65 days.

(21) Appl. No.: 17/573,256

(22) Filed: Jan. 11, 2022

(65) Prior Publication Data

US 2022/0222304 A1 Jul. 14, 2022

(30) Foreign Application Priority Data

Jan. 12, 2021 (KR) ........................ 10-2021-0003761

(51) Int. Cl.
 *G06F 16/9532* (2019.01)
 *G06F 16/9032* (2019.01)
 *G06F 16/9038* (2019.01)
(52) U.S. Cl.
 CPC .... *G06F 16/9532* (2019.01); *G06F 16/90324* (2019.01); *G06F 16/9038* (2019.01)
(58) Field of Classification Search
 CPC . G06F 16/9038; G06F 16/9532; H04L 51/04; H04L 51/046; H04L 51/52
 See application file for complete search history.

(56) References Cited

U.S. PATENT DOCUMENTS

| | | | | |
|---|---|---|---|---|
| 2012/0016678 A1* | 1/2012 | Gruber | ................... | G06F 40/30 704/E21.001 |
| 2014/0040224 A1* | 2/2014 | Grant | ................. | G06Q 30/0256 707/706 |
| 2016/0330150 A1 | 11/2016 | Joe et al. | | |
| 2017/0243136 A1* | 8/2017 | Ho Kang | ............. | H04L 51/046 |
| 2021/0208752 A1* | 7/2021 | Hwang | ................. | G06Q 50/01 |

FOREIGN PATENT DOCUMENTS

| | | | |
|---|---|---|---|
| EP | 3479213 B1 * | 10/2017 | ......... G06F 3/04886 |
| KR | 10-2016-0131866 A | 11/2016 | |
| KR | 10-2018-0087608 A | 8/2018 | |
| KR | 10-2079221 B1 | 2/2020 | |

OTHER PUBLICATIONS

Korean Office Action dated Feb. 22, 2025 in Application No. 10-2021-0003761.

* cited by examiner

*Primary Examiner* — Taelor Kim
(74) *Attorney, Agent, or Firm* — Sughrue Mion, PLLC

(57) ABSTRACT

A method, a computer system, a server, and a non-transitory computer-readable storage medium for providing a search service are provided. The method of providing the search service includes: executing the search service provided through a chatroom associated with a messenger application; and, based on a first search term input for the search service, displaying, on a search entry area, first search results corresponding to the first search term and at least one auto-complete search term of the first search term.

21 Claims, 8 Drawing Sheets

APPARATUS AND METHOD FOR PROVIDING SEARCH SERVICE IN ASSOCIATION WITH CHATROOM OF MESSENGER APPLICATION

CROSS-REFERENCE TO RELATED APPLICATIONS

This application claims priority under 35 U.S.C. § 119 to Korean Patent Application No. 10-2021-0003761, filed on Jan. 12, 2021 in the Korean Intellectual Property Office, the disclosure of which is incorporated by reference herein in its entirety.

BACKGROUND

1. Field

Example embodiments of the present disclosure relate to a method and apparatus for providing a search service in association with a chatroom of a messenger application, and more particularly, to a method and apparatus for providing search results for an input search term through a search service that is provided through a chatroom on a search entry area with an autocomplete search term of the search term.

2. Description of Related Art

A messenger application is widely used in exchanging messages or contents between users. The messenger application is installed on a mobile terminal or a personal computer (PC) of a user and enables the user to exchange a message with another user or to send content to the other user. The user of the messenger application manages a chat with other users through a chatroom. That is, the user and the other user may exchange messages and contents in the chatroom.

This messenger application may provide a function of sending and receiving messages between users included in the chatroom and a search function, that is, a search service through interaction with a search engine.

SUMMARY

According to an aspect of an example embodiment, there is provided a method of providing a search service of a computer system, the method including executing the search service provided through a chatroom associated with a messenger application; and, based on a first search term input for the search service, displaying, on a search entry area, first search results corresponding to the first search term and at least one autocomplete search term of the first search term.

The search entry area is displayed as an overlay over the chatroom according to execution of the search service, the search entry area may include a first area for inputting the first search term and a second area for displaying the first search results corresponding to the first search term and the at least one autocomplete search term, and the displaying of the first search results and the at least one autocomplete search term includes displaying the first search results corresponding to the first search term at an upper end of the second area and displaying the at least one autocomplete search term below the first search results corresponding to the first search term.

The displaying of the first search results and the at least one autocomplete search term may include displaying the first search results corresponding to the first search term and the at least one autocomplete search term on the search entry area without receiving, from a user, a search request for displaying the first search results after the first search term being input, and a subset of the first search results corresponding to the first search term includes a first portion corresponding to the first search term or a second portion corresponding to a first autocomplete search term of the first search term.

When the first search term corresponds to an incomplete query, the displaying of the first search results and the at least one autocomplete search term may include displaying, on the search entry area, the at least one autocomplete search term and the second portion corresponding to the first autocomplete search term, and the first autocomplete search term is determined based on a search term input history of the user for the search service.

A portion of the first search results corresponding to the first search term may include at least one of an image related to the first search term, a video related to the first search term, movie information related to the first search term, television (TV) program information related to the first search term, place information related to the first search term, official account information related to the first search term, and person information related to the first search term.

The method may include sharing, through the chatroom, one or more search results selected from a portion of the first search results corresponding to the first search term displayed on the search entry area.

The sharing of the one or more search results may include receiving a first selection of at least one content from the portion of the first search results corresponding to the first search term, identifying the at least one content as content to be shared, displaying the content to be shared to be distinguished from other contents among the portion of the first search results corresponding to the first search term, and based on receiving a second selection of the content to be shared that is distinguishably displayed, sharing second content indicated by the second selection through the chatroom.

The displaying of the first search results and the at least one autocomplete search term may include, based on a change in the first search term input for the search service resulting in a second search term, displaying, on the search entry area, second search results corresponding to the second search term and a second autocomplete search term of the second search term.

The method may further include, based on receiving a selection of the at least one autocomplete search term displayed on the search entry area, providing second search results corresponding to the selection.

The first search results corresponding to the first search term may include first modeled search results corresponding to the first search term or second modeled search results corresponding to the at least one autocomplete search term, the first modeled search results and the second modeled search results having been generated at a server that provides the search service.

The first modeled search results or the second modeled search results may include second search results corresponding to a second search term that is a combination of the first search term or the at least one autocomplete search term of the first search term and a third search term, and the third search term may be determined based on a search term input history of another search term input from a user for the search service with the first search term or the at least one autocomplete search term, determined based on news related to the first search term or the at least one autocomplete search term or issue information provided from the search service, or determined based on information related to the chatroom.

A portion of the first search results corresponding to the first search term may include second search results that correspond to information related to the chatroom, and the information related to the chatroom may include at least one of a topic of the chatroom, a keyword that is determined based on a first message sent in the chatroom or a second message received in the chatroom, and a location of a user included in the chatroom.

The method may further include displaying recommendation content on the search entry area after the search service is executed and before the first search term is input for the search service, wherein the displaying of the first search results and the at least one autocomplete search term comprises, based on the first search term being input for the search service, displaying the first search results corresponding to the first search term and the at least one autocomplete search term on the search entry area, and stopping the displaying of the recommendation content.

The recommendation content may be determined based on information related to the chatroom including at least one of a topic of the chatroom, a keyword that is determined based on a first message sent in the chatroom or a second message received in the chatroom, and a location of a user included in the chatroom, and the recommendation content may include at least one of place information about a place that is determined based on the location of the user included in the chatroom, a first recommendation search term that is determined based on the keyword, and a second recommendation search term that is determined based on the topic of the chatroom.

The recommendation content may include participating content that allows participation of at least one user included in the chatroom, and the participating content may include game content that allows play of the at least one user, a survey that allows participation of the at least one user, and test content that allows participation of the at least one user.

A portion of the first search results corresponding to the first search term may include second search results of a type preset for a category to which the first search term belongs.

According to an aspect of an example embodiment, there is provided a non-transitory computer-readable storage medium storing a program that, when executed by at least one processor of a computer system, causes the computer system to execute the search service provided through a chatroom associated with a messenger application; and based on a first search term input for the search service, display, on a search entry area, first search results corresponding to the first search term and at least one autocomplete search term of the first search term According to an aspect of an example embodiment, there is provided a computer system, the computer system including a memory storing instructions; and at least one processor communicatively coupled to the memory, wherein the at least one processor is configured to execute the computer-readable instructions and cause the computer system to execute a search service provided through a chatroom associated with a messenger application; and, based on a search term input for the search service, to display, on a search entry area, search results corresponding to the search term and at least one autocomplete search term of the search term.

According to an aspect of an example embodiment, there is provided a method of providing a search service of a server that provides the search service through a chatroom associated with a messenger application, the method including, based on a request from a user terminal through the chatroom, providing the search service to the user terminal in association with the chatroom; and, based on a search term input for the search service from the user terminal, providing search results corresponding to the search term and at least one autocomplete search term of the search term to the user terminal, and causing the search results corresponding to the search term and the at least one autocomplete search term to be displayed on an search entry area.

The providing of the search results corresponding to the search term and the at least one autocomplete search term may include providing the search results corresponding to the search term and the at least one autocomplete search term to the user terminal without receiving, from the user terminal, a search request for displaying the search result after the search term being input, and the a subset of the search results corresponding to the search term may include a first portion corresponding to the search term or a second portion corresponding to a first autocomplete search term of the search term.

The providing of the search results corresponding to the search term and the at least one autocomplete search term may include, based on a change in the search term input for the search service from the user terminal resulting in a changed search term, providing updated search results corresponding to the changed search term and the at least one updated autocomplete search term of the changed search term to the user terminal.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
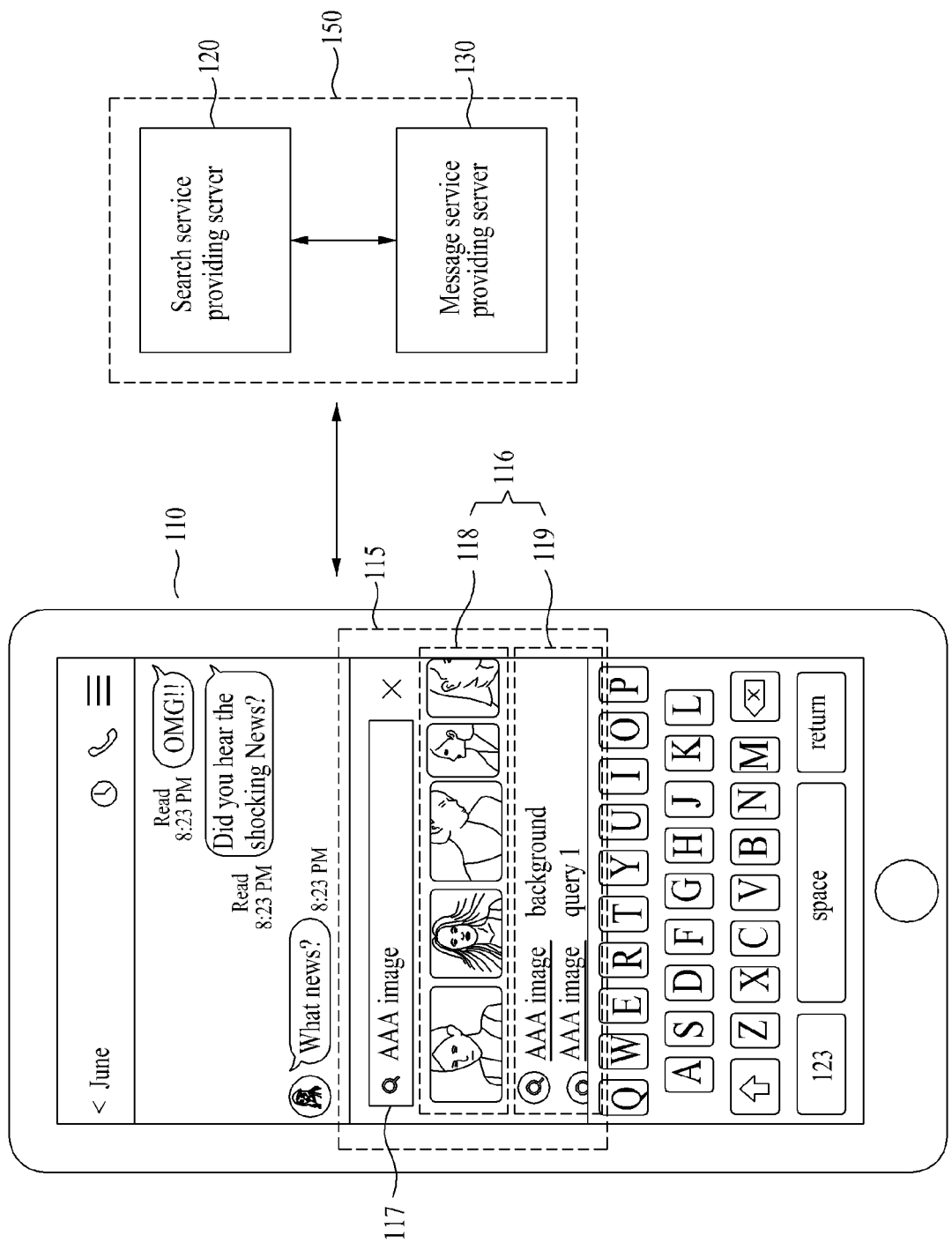
FIG. 1 illustrates an example of a method of providing a search service through a chatroom associated with a messenger application according to at least one example embodiment.

Example embodiments are described in greater detail below with reference to the accompanying drawings.

In the following description, like drawing reference numerals are used for like elements, even in different drawings. It should be noted that the drawings are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to other elements or features as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor (DSP), a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), a CPU, a controller, an ALU, a DSP, a microcomputer, a microprocessor, and the like, the computer processing device may be configured to carry out program code by performing arithmetical, logical, and input/output operations, according to the program code.

Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/Digital Versatile Disk (DVD)/Compact Disc Read-Only Memory (CD-ROM) drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Alternatively or additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 illustrates an example of a method of providing a search service through a chatroom associated with a messenger application according to at least one example embodiment.

FIG. 1 illustrates a screen of a computer system 110 for executing a messenger application. The computer system 110 may be, for example, a mobile user terminal such as a smartphone or a computing device such as a personal computer (PC).

The messenger application may be a program or an application used to exchange a message or content between users. The messenger application may be installed in the computer system 110 corresponding to a mobile terminal or a PC of a user. That is, the messenger application may be a computer program for the mobile terminal or the PC.

A user of the computer system 110 may initiate execution of the messenger application and may exchange a message with another user and/or may send content to the other user through a chatroom provided by the messenger application. Such a messaging service may be provided to the computer system 110 through a message service providing server 130 configured as a computer system.

Alternatively or additionally, the messenger application may provide a search function, for example, a search service, through interaction with a search engine. The search service may be provided through a chatroom associated with the messenger application. For example, a user of the computer system 110 may execute the search service through a user interface provided in the chatroom. The computer system 110 may execute the search service without terminating the messenger application or leaving the chatroom, or without an operation of executing the messenger application on a background. Each user included in the chatroom may input a search term for the search service and may receive search results for the search term. The search service may be provided to the computer system 110 through a search service providing server 120 configured as a computer system. In some embodiments, the search term may include at least one keyword (or word) or a portion thereof.

Referring to FIG. 1, the message service providing server 130 and/or the search service providing server 120 may be implemented as separate computer systems or may be implemented as a single server 150. Also, the message service providing server 130 and/or the search service providing server 120 may be implemented using a plurality of computer systems. In the following description, the message service providing server 130 and/or the search service providing server 120 may be referred to as the server 150 for clarity of description.

Figure 5:
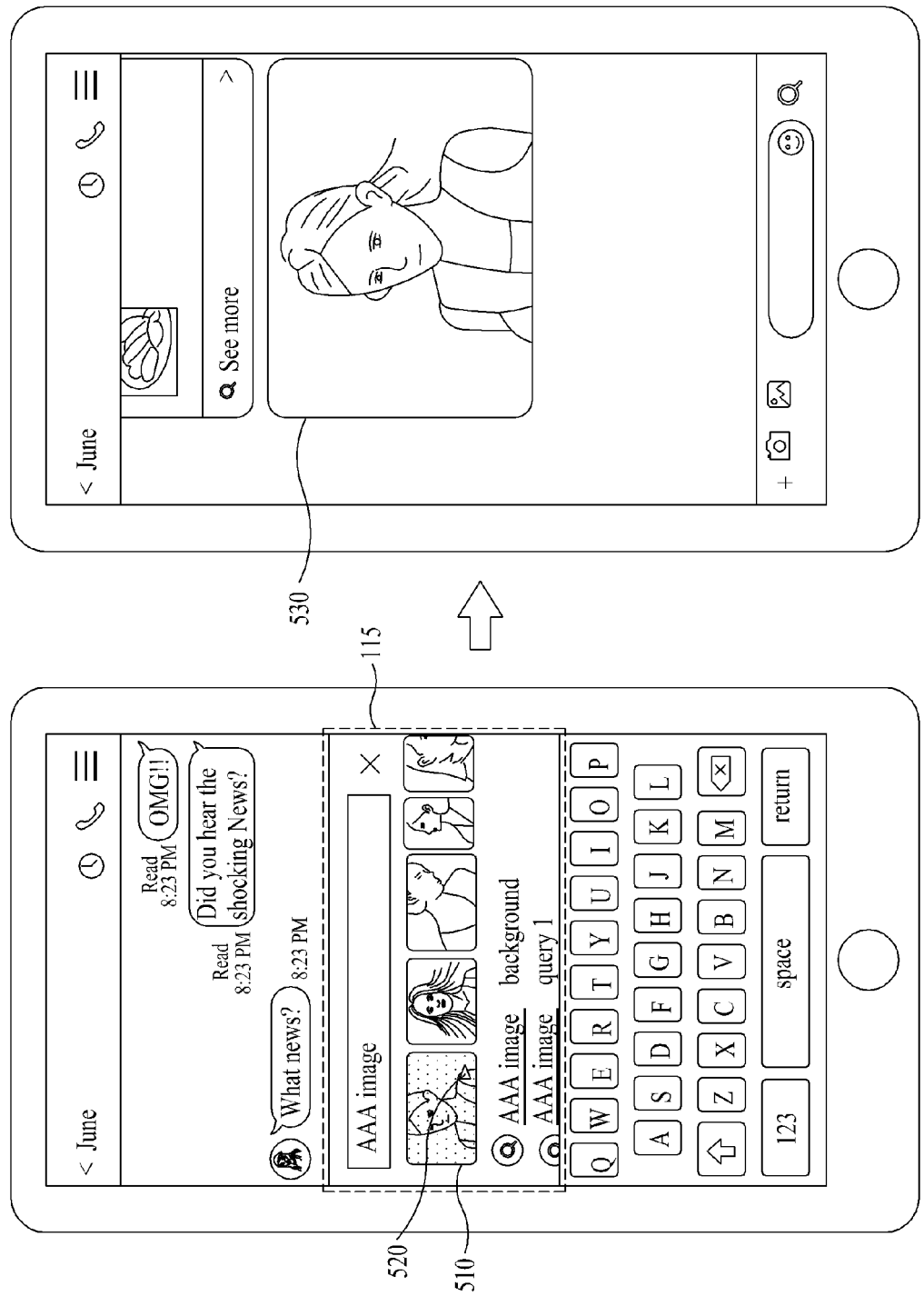
FIG. 5 illustrates an example of a method of sharing search results displayed on a search entry area in a chatroom according to at least one example embodiment.

The search service provided through the chatroom is executed on the screen of the computer system 110 of FIG. 1. For example, the search service may be executed in response to a selection on a search button included in a message input interface of the chatroom. In some embodiments, the search button may be configured as a button in a shape of a magnifying glass on the right of a message input box (e.g., as shown in FIG. 5).

Once the search function is executed, a search entry area 115 may be displayed on the screen of the computer system 110. The search entry area 115 may be displayed to be overlaid on the chatroom in response to execution of the search service. That is, even in a state in which the search entry area 115 is displayed, at least a portion of messages sent and/or received in the chatroom may be identified. The search entry area 115 may be displayed above a virtual keyboard used to input a message and/or a search term.

The search entry area 115 may include a first area 117 for inputting a search term for the search service and a second area 116 for displaying search results and/or one or more autocomplete search terms 119. In an example embodiment, search results 118 corresponding to a search term input through the first area 117, as well as one or more autocomplete search terms 119 of the search term input through the first area 117, may be displayed on the second area 116. Referring to FIG. 1, the search results 118 corresponding to the search term may be displayed at an upper end of the second area 116 and the one or more autocomplete search terms 119 may be displayed below the search results 118.

The search results 118 provided through the search entry area 115 may be displayed on the search entry area 115 when the search term is input through the first area 117, even if there is no search request (e.g., touch of a return (or enter) key on the virtual keyboard after an input of the search term is completed) for the search term using the search service and to display search results for the search term. Such search results corresponding to the search term may include a portion of search results for the input search term and/or may include a portion of search results for a first autocomplete search term of the input search term.

For example, referring to FIG. 1, when "AAA image" is input through the first area 117, one or more images (i.e., thumbnails of the one or more images) corresponding to search results of "AAA image" from a search engine may be displayed on the search entry area 115 even if the return (or enter) key of the virtual keyboard has not touched. Alternatively or additionally, even when an incomplete search term such as "AAA ima" is input, the one or more images corresponding to the search results of "AAA image," that is the autocomplete search term of the corresponding search term "AAA ima," may be displayed.

In some embodiments, the computer system 110 may provide search results according to a predetermined (and/or desired) default ranking in association with the input search term. For example, "AAA" may be a person category, and the server 150 and/or the computer system 110 may be configured to preferentially provide image search results if the search term corresponds to the person category. In such an example, although only "AAA" is input through the first area 117, the computer system 110 may display the one or more images corresponding to the "AAA image" on the search entry area 115.

As described above, in an example embodiment, in response to a search term being input through the first area 117, the computer system 110 may provide search results 118 corresponding to the input search term in addition to providing the one or more autocomplete search terms 119 through the search entry area 115. In other embodiments, the computer system 110 may share the provided search results 118 in a chatroom based on a selection from the user.

As such, one or more example embodiments of the present disclosure may improve convenience and efficiency of a search service provided through a chatroom, thus, providing a potentially better user experience to a user of the search service.

A configuration and an operation of the computer system 110 and the server 150 that provide a search service and a method of providing a search service in association with a chatroom according to an example embodiment are further described with reference to FIGS. 2 to 8.

Figure 2:
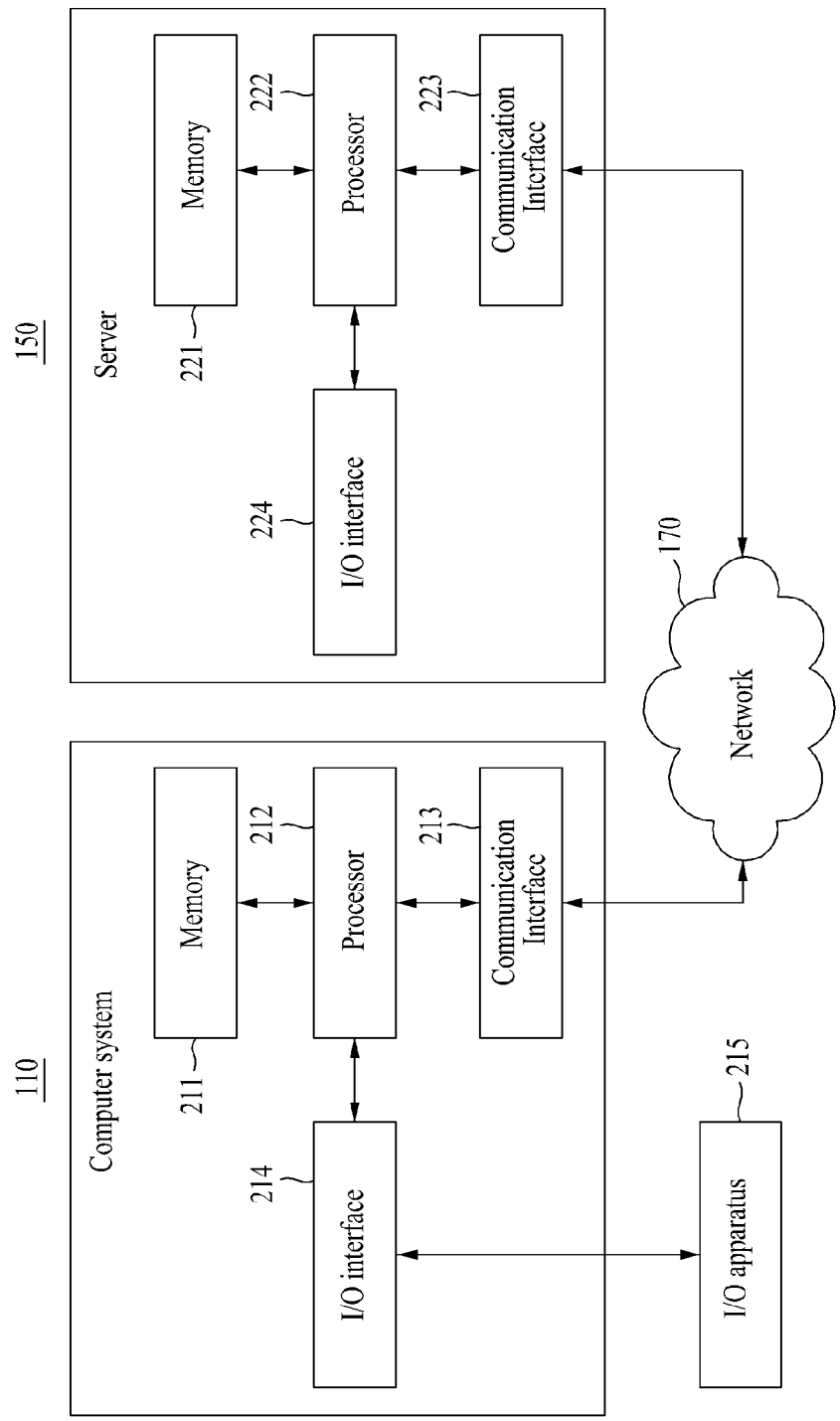
FIG. 2 is a diagram illustrating a server and a computer system (e.g., a user terminal) for providing a search service through a chatroom associated with a messenger application according to at least one example embodiment.

FIG. 2 is a diagram illustrating a computer system (e.g., a user terminal) providing a search service through a chatroom associated with a messenger application and a server according to at least one example embodiment.

The computer system 110 of FIG. 2 may correspond to a user terminal of FIG. 1. In the following drawings, although the computer system 110 is illustrated as a smartphone and a device similar thereto, the computer system 110 may be a PC, a laptop computer, a tablet, an Internet of Things (IoT) device, and/or a wearable computer.

The computer system 110 may be a client for the server 150.

The server 150 may provide a messaging service and/or a search service through a messenger application. For example, the server 150 may provide, as part of the search service, search results for a search term received from the computer system 110 through a search engine to the computer system 110. Alternatively or additionally, the server 150 may provide, as part of the messaging service, one or more users of one or more computer systems 110 with a messenger application that may exchange messages and/or send content among the one or more users through a chatroom provided by the messenger application.

In some embodiments, the server 150 may be implemented as at least one computer system and/or may be located at a remote location (e.g., different location) from the computer system 110. The server 150 may communicate with the computer system 110 over a network 170 in a wireless or wired manner.

Referring to FIG. 2, the computer system 110 may include a memory 211, a processor 212, a communication interface 213, and an input/output (I/O) interface 214. The server 150 may include a memory 221, a processor 222, a communication interface 223, and an I/O interface 224.

The memory 211 and/or the memory 221 may include a permanent mass storage device, such as RAM, a ROM, a disk drive, a solid state drive (SSD), a flash memory, and the like, as a non-transitory computer-readable record medium. The permanent mass storage device, such as ROM, SSD, flash memory, and disk drive, may be included in the computer system 110 and/or the server 150 as a permanent storage device separate from the memory 211 and/or the memory 221. Alternatively or additionally, an OS and/or at least one program code (e.g., a code for a browser installed and executed on the computer system 110 or an application installed and executed on the computer system 110 to provide a specific service) may be stored in the memory 211 and/or the memory 221. Such software components may be loaded from another non-transitory computer-readable record medium separate from the memory 211 and/or the memory 221. The other non-transitory computer-readable record medium may include a non-transitory computer-readable record medium, for example, a floppy drive, a disk, a tape, a DVD/CD-ROM drive, a memory card, and the like. According to other example embodiments, software components may be loaded to the memory 211 and/or the memory 221 through the communication interface 213 and/or the communication module 223, in addition to or instead of the non-transitory computer-readable record medium. For example, at least one program may be loaded to the memory 211 and/or the memory 221 based on a computer program, for example, the application, installed by files provided over the network 170 from developers or a file distribution system providing an installation file of the application.

The processor 212 and/or the processor 222 may be configured to process instructions of a computer program by performing basic arithmetic operations, logic operations, and I/O operations. The computer-readable instructions may be provided from the memory 211 and/or the memory 221 or the communication interface 213 and/or the communication interface 223 to the processor 212 and/or the processor 222. For example, the processor 212 and/or the processor 222 may be configured to execute received instructions in response to the program code stored in the storage device, such as the memory 211 and/or the memory 221.

The communication interface 213 and/or the 223 may be configured to provide for communication between the computer system 110 and the server 150 over the network 170 and/or may be further configured to provide for communication between the computer system 110 and/or the server 150 and another electronic device or another server. For example, the processor 212 of the computer system 110 may forward a request created based on a program code stored in the storage device such as the memory 211, to the server 150 over the network 170 under control of the communication interface 213. Alternatively or additionally, a control signal, an instruction, content, a file, etc., provided under control of the processor 222 of the server 150 may be received at the computer system 110 through the communication interface 213 of the computer system 110 by going through the communication interface 223 and the network 170. For example, a control signal, an instruction, content, a file, etc., of the server 150 received through the communication interface 213 may be forwarded to the processor 212 or the memory 211, and content, a file, etc., may be stored in a storage medium, for example, the permanent storage device, further includable in the computer system 110.

The I/O interface 214 may be a device used for interface with an I/O apparatus 215. For example, the I/O apparatus 215 may include an input device such as a keyboard, a mouse, a microphone, a camera, and the like. Alternatively or additionally, the I/O apparatus 215 may include an output device may such as a display, a speaker, a haptic feedback device, and the like. As another example, the I/O interface 214 may be a device for interface with an apparatus in which an input function and an output function are integrated into a single function, such as a touchscreen. The I/O apparatus 215 may be configured as a single device with the computer system 110. Alternatively or additionally, the I/O interface 224 of the server 150 may be a device for interface with an apparatus (not shown) for input or output that may be connected to the server 150 and/or included in the server 150. For example, when the processor 212 of the computer system 110 processes an instruction of a computer program loaded to the memory 211, content or a service screen configured based on data provided from the server 150 may be displayed on the display through the I/O interface 214.

According to other example embodiments, the computer system 110 and the server 150 may include a number of components greater than or less than a number of components shown in FIG. 2. However, there is no need to clearly illustrate many components according to the related art. For example, the computer system 110 may include at least a portion of the I/O apparatus 215, or may further include other components, for example, a transceiver, a global positioning system (GPS) module, a camera, a variety of sensors, a database (DB), and the like. For example, if the computer system 110 is a smartphone, the computer system 110 may be configured to further include a variety of components, for example, an acceleration sensor, a gyro sensor, a camera module, various physical buttons, a button using a touch panel, an I/O port, a vibrator for vibration, etc., which are generally included in the smartphone.

For example, the computer system 110 may output a search term and a message input from a user through a display device that is the output device, and may output search results for the search term. The display device may include a touchscreen. A user of the computer system 110 may input a message output from a chatroom through a touchscreen or may input a search term for a search service provided through the chatroom. That is, the display device may be configured to include a function of the input device. The display device may include a virtual keyboard used to input the search term and the message.

The following method of providing a search service through a chatroom associated with a messenger application may be performed by the processor 212 and/or the processor 222. The method of providing a search service through a chatroom associated with a messenger application and an operation and a function of the computer system 110 and the server 150 are further described in detail with reference to FIGS. 3 to 8.

The description related to technical features made above with reference to FIG. 1 may apply to FIG. 2 and further description is omitted.

In the following description, for clarity of description, a function and/or an operation performed by the computer system 110 (e.g., the user terminal and/or the client) or a configuration included therein or by the server 150 or a configuration included therein may be described to be performed by the computer system 110 or the server 150 rather than a corresponding component.

Alternatively or additionally, in the following, at least a portion of an operation and an arithmetic operation performed by the computer system 110 may be implemented as being performed by the server 150, and at least a portion of an operation and an arithmetic operation performed by the server 150 may be implemented as being performed by the computer system 110.

Figure 3:
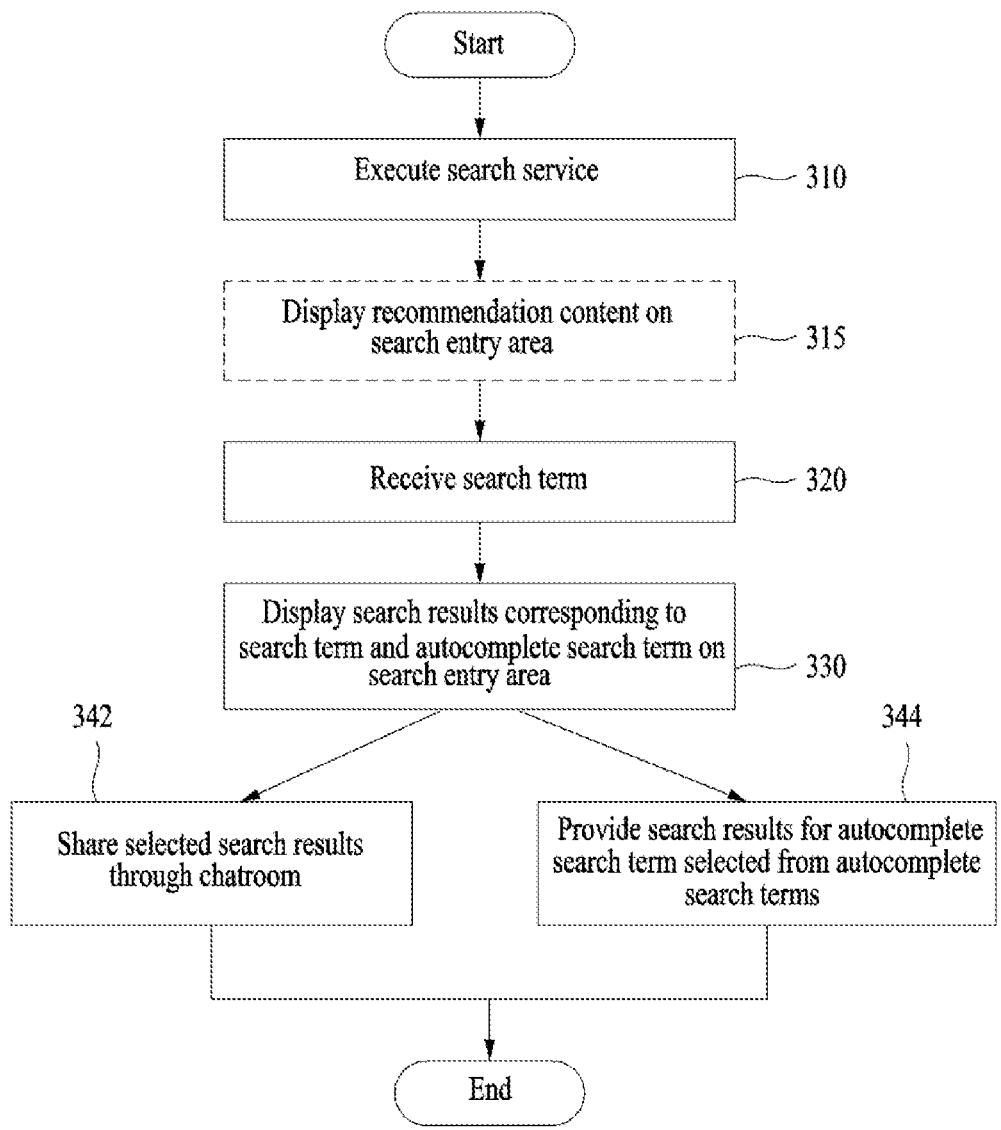
FIG. 3 is a flowchart illustrating an example of a method of providing a search service through a chatroom associated with a messenger application according to at least one example embodiment.

FIG. 3 is a flowchart illustrating an example of a method of providing a search service through a chatroom associated with a messenger application according to at least one example embodiment.

Referring to FIG. 3, in operation 310, the computer system 110 may execute a search service provided through a chatroom associated with a messenger application. For example, a user of the computer system 110 may request the server 150 for execution of the search service by selecting a search button included in a message input interface of the chatroom. In response to the request through the chatroom from the computer system 110, the server 150 may provide the search service in association with the chatroom to the computer system 110. The search service may provide search results through a search engine for the input search term. For example, the search results provided through the search service may include a web document related to the search term, an image related to the search term, a video related to the search term, movie information related to the search term, television (TV) program information related to the search term, place information (e.g., must-try restaurant information and hot spot information) related to the search term, official account information (e.g., advertising information and event information of an advertiser corresponding to an official account) related to the search term, and person information (e.g., influencer information) related to the search term. That is, through the search service, contents of various categories (or domains) may be provided as search results for the input search term.

In operation 320, the computer system 110 may receive the search term from the user through the executed search service. As described above with reference to FIG. 1, the search term may be input through a search term input box, for example, the first area 117, included in the search entry area 115. When the user enters the search term and then touches the return (or enter) key on the virtual keyboard of the computer system 110, a query corresponding to the search term may be sent to the server 150 and the server 150 may obtain search results for the search term and may provide the search results to the computer system 110.

In operation 330, in response to the search term input for the search service in operation 320, the computer system 110 may display the search results 118 corresponding to the search term and at least one or more autocomplete search terms 119 of the search term on the search entry area 115. The search results 118 and the one or more autocomplete search terms 119 may be provided from the server 150. Even if there is no search request (e.g., an operation of touching the return (or enter) key on the virtual keyboard of the computer system 110) from the user using the search term for the search service to display search results for the search term, the computer system 110 may display (e.g., provide) the search results 118 and the or more autocomplete search terms 119 through the search entry area 115. That is, without receiving a separate search request or a search instruction from the user, the computer system 110 may provide the search results 118 corresponding to the corresponding search term and the one or more autocomplete search terms 119 through the search entry area 115 in real time or substantially in real time in response to the search term that is input through the search term input box, for example, the first area 117 of FIG. 1.

Referring to FIG. 1, each autocomplete search term 119 may be displayed such that a part that matches the input search term and a part that does not match the input search term may be distinguished from each other.

Search results corresponding to a search term displayed through the search entry area 115 may include a portion of search results for the search term (i.e., search results output when the corresponding search term is input to a search engine) or search results for a first autocomplete search term of the search term (i.e., search results when the corresponding first autocomplete search term is input to the search engine).

For example, if the search term input through the first area 117 is "AAA image" as illustrated in FIG. 1, the search results 118 displayed through the search entry area 115 may include a plurality of images as search results of an image category or domain for "AAA." A preset number of images may be displayed on the second area 116 as the search results 118. The images may be scrolled within the second area 116, for example, in response to a swipe direction in a lateral direction. The images displayed as the search results 118 may be ranked according to a degree of relevance to the search term (e.g., "AAA") that is input through the first area 117.

The search results 118 may refer to various categories or domains, and are not limited to an image. For example, the search results 118 may include at least one of an image related to the search term, a video related to the search term, movie information related to the search term, TV program information related to the search term, place information (e.g., must-try restaurant information and hot spot information) related to the search term, official account information (e.g., advertising information and event information of an advertiser corresponding to an official account) related to the search term, and person information (e.g., influencer information) related to the search term. The search results 118 displayed on the search entry area 115 may be a thumbnail of corresponding content or search result rather than the content or the search results itself.

For example, if a search term such as "AAA image" is input as the search term, the search results 118 may include an image related to "AAA". For another example, if a search term such as "AAA video" is input as the search term, the search results 118 may include a video related to "AAA". For another example, a search term such as "AAA movie" is input as the search term, the search results 118 may include movie information related to "AAA". For another example, if a search term such as "AAA restaurant" is input as the search term, the search results 118 may include must-try restaurant information as place information related to "AAA". For another example, if a search term such as "AAA official account/OA" is input as the search term, the search results 118 may include advertising information or event information related to "AAA". For another example, if a search term such as "AAA Instagram/blog/mini-homepage/Facebook/SNS/YouTube" is input as the search term, the search results 118 may include content provided from Instagram/blog/mini-homepage/Facebook/SNS/YouTube of "AAA" as person information related to "AAA."

In some embodiments, if the search term input through the first area 117 is incomplete (e.g., the search term corresponds to an incomplete search term and/or query), the computer system 110 may display the search results 118 and the one or more autocomplete search terms 119 on the search entry area 115, which is similar to the aforementioned example In such embodiments, the server 150 may determine whether the input search term corresponds to the incomplete search term and/or query and may determine an autocomplete search term (e.g., the aforementioned first autocomplete search term) most suitable for the corresponding incomplete query. The server 150 may display search results for the determined first autocomplete search term on the search entry area 115. For example, if the search term input through the first area 117 is an incomplete query such as "AAA ima," the computer system 110 may display, on the search entry area 115, one or more images corresponding to search results of "AAA image" that is the first autocomplete search term for "AAA ima."

In some embodiments, the first autocomplete search term may be determined based on a search term input history of the user for the search service. The server 150 may determine the first autocomplete search term for the incomplete query input through the computer system 110, by referring to the search term input history by the user and/or the other users of the computer system 110. For example, by referring to the search term input history by the user and/or the other users of the computer system 110, the server 150 may determine, as the first autocomplete search term, a search term best matching the incomplete query input through the computer system 110 and/or a search term having a top input frequency among search terms including the corresponding incomplete query.

In some embodiments, if a search term input history by the user and/or the other users of the computer system 110 for a specific search term (e.g., "AAA image") is absent or insufficient (e.g., a quantity of search term input history does not meet (e.g., is less than) a predetermined and/or desired amount), the search results 118 may be displayed on the search entry area 115 when the complete specific search term is input on the first area 117. In other embodiments, if the search term input history by the user and/or the other users of the computer system 110 for the specific search term (e.g., "AAA image") is sufficient (e.g., the quantity of search term input history meets or exceeds (e.g., is greater than or equal to) the predetermined and/or desired amount), the search results 118 may be displayed on the search entry area 115 even if only a portion of the specific search term is input on the first area 117.

In some embodiments, for a search term "AAA" and/or a search term related thereto, priority may be set to a type (e.g., a category or a domain) of search results provided from the server 150 and/or the computer system 110. For example, when "AAA" corresponds to a search term that belongs to a person category, the computer system 110 may provide the search results 118 including an image as a top ranking on the search entry area 115.

In such embodiments, if the search term input through the first area 117 is "AAA," "AAA image" among the one or more autocomplete search terms 119 may be preferentially displayed on the search entry area 115 (e.g., at a top end). Alternatively or additionally, the search results 118 including the image and the autocomplete search term "AAA image" may be simultaneously displayed on the search entry area 115.

As described above, for the input search term, the computer system 110 may display, on the search entry area 115, search results of a type preset for a category to which the corresponding search term belongs.

A category to which a corresponding search term belongs (e.g., person, movie, TV program, place, and sports) may be predefined in the computer system 110 and/or the server 150. Also, a type of the search results 118 to be displayed on the search entry area 115 and the one or more autocomplete search terms 119 for the search term to be displayed on the search entry area 115 may be predefined in the computer system 110 and/or the server 150 according to the category to which the search term belongs.

For example, when a search term "AAA" is input in the computer system 110, the server 150 may identify a category to which the search term "AAA" belongs even before additional content such as "ima . . . " is input. Accordingly, the server 150 may determine the search results 118 of a type corresponding to the search term "AAA" and may display the determined search results 118 on the search entry area 115. Likewise, the server 150 may determine the one or more autocomplete search terms 119 of "AAA" based on a category to which "AAA" belongs and may display the same on the search entry area 115. For example, if the input search term belongs to a "person" category, the search results 118 displayed on the search entry area 115 may include an image. For another example, when the input search term belongs to a "sports" category, the search results 118 displayed on the search entry area 115 may include a video.

In some embodiments, a type of the search results 118 displayed on the search entry area 115 may be preset (e.g., pre-defined) for the input search term itself (i.e., not the category of the search term). In such embodiments, an operation of the server 150 and/or the computer system 110 that determines the category of the search term may not be performed.

The type of the search results 118 displayed on the search entry area 115 based on the search term (or the category of the search term) may be determined based on a previous search history for the corresponding search term (or the category of the search term) in the search service. For example, a type of search results most selected for the search term (or the category of the search term) or a type of search results most displayed in the search service may be determined as the type of the search results 118 displayed on the search entry area 115. A search history used to determine the type of the search results 118 displayed on the search entry area 115 may be a personal search history of the user of the computer system 110. Alternatively or additionally, the search history may include search histories of a plurality of users using the search service.

In some embodiments, the category of the search term may be determined based on at least one of a search history in the search service, information predefined in the server 150 and/or the computer system 110, and/or results of parsing a web document (e.g., news) that includes a word included in the corresponding search term.

According to an example embodiment, if a type (a domain or a category) of search results to be obtained through a search term is not particularly specified when inputting the corresponding search term, the search results 118 suitable for the search term or a category to which the search term belongs may be displayed on the search entry area 115.

Therefore, according to some example embodiments, convenience in using the search service may be improved.

As described above with reference to FIG. 1, the search entry area 115 may be displayed to be overlaid on a chatroom according to execution of the search service through the chatroom. That is, the search entry area 115 may be displayed as an overlay over the chatroom. In some embodiments, the search entry area 115 may be displayed with a predetermined degree of transparency to minimize interference with displaying of messages sent and/or received in the chatroom. The search entry area 115 may include the first area 117 for inputting a search term and the second area 116 for displaying the search results 118 corresponding to the search term and the one or more autocomplete search terms 119. As illustrated in FIG. 1, the search results 118 corresponding to the search term may be displayed at the upper end of the second area 116 and the one or more autocomplete search terms 119 may be displayed below the search results 118. In other embodiments, the search entry area 115 may be provided at an upper end or on the right or the left of the screen of the computer system 110 depending on implementation examples.

In some embodiments, in response to a change in the search term input for the search service (i.e., the search term input through the first area 117), the computer system 110 may display updated search results corresponding to the changed search term and at least one updated autocomplete search term of the changed search term on the search entry area 115. That is, in response to the search term that changes according to an input, the computer system 110 may adaptively update the search results 118 corresponding to the search term and the one or more autocomplete search terms 119 displayed on the search entry area 115 in real time or almost in real time. For example, when "AAA image" is input as the search term, a general image of "AAA" (an image corresponding to search results of an image category) may be displayed on the search entry area 115. In such an example, when the search term is changed with "XAA image," "AAA image background," and the like according to an additional input, the search results corresponding to the changed search term may be displayed on the search entry area 115 as the updated search results.

Referring again to FIG. 3, in operation 342, the computer system 110 may share search results selected from the search results 118 corresponding to the search term displayed on the search entry area 115, through the chatroom. The computer system 110 may share search results (e.g., one selected by touching an image/content the user desires to share) selected by the user from the search results 118 displayed on the search entry area 115. A method of sharing the search results 118 through the chatroom is further described with reference to FIGS. 4 and 5.

In operation 344, in response to receiving a selection on the autocomplete search term 119 displayed on the search entry area 115, the computer system 110 may provide search results for the selected autocomplete search term 119. For example, the user may touch one of the one or more autocomplete search terms 119 displayed on the search entry area 115 and, in response thereto, search results for the selected autocomplete search term 119 may be provided to the computer system 110 through the search engine of the search service. The search results may be displayed to be overlaid on the messenger application (e.g., a chatroom) in a form of a popup window. The popup window on which the search results are displayed may provide a user interface (e.g., a share button) for sharing the corresponding search results in the chatroom. When the user interface is selected (e.g., the share button is clicked or pressed), the search results may be shared in the chatroom.

In some embodiments, in response to a search request for the search term that is input from the user, the computer system 110 may display search results for the corresponding search term. For example, in response to an operation of touching the return (or enter) key on the virtual keyboard after inputting the search term, the computer system 110 may display search results for the input search term that are provided through the search engine of the search service. The search results may be displayed to be overlaid on the messenger application (e.g., a chatroom) in a form of a popup window. The popup window on which the search results are displayed may provide a user interface (e.g., a share button) for sharing the corresponding search results in the chatroom. When the user interface is selected (e.g., the share button is clicked or pressed), the search results may be shared in the chatroom.

Also, in an example embodiment, in operation 315, the computer system 110 may display recommendation content on the search entry area 115 after the search service is executed and before the search term is input for the search service (e.g., on the first area 117). The recommendation content being displayed may be provided from the server 150. That is, in an example embodiment, content that may attract attention of the user may be displayed on the search entry area 115 before the search term is input. In response to a selection from the user, the computer system 110 may provide detailed information about the recommendation content in a form of a popup window. The popup window may be displayed to be overlaid on the messenger application (e.g., a chatroom). The popup window may provide a user interface (e.g., a share button) for sharing the corresponding recommendation content in the chatroom. When the user interface is selected (e.g., the share button is clicked or pressed), the recommendation content or the detailed information thereof may be shared in the chatroom.

In response to an input of the search term for the search service (i.e., in the first area 117), the computer system 110 may display the search results 118 corresponding to the search term and the one or more autocomplete search terms 119 on the search entry area 115, instead of displaying the recommendation content. That is, the computer system 110 may stop displaying the recommendation content, and start displaying the search results 118 corresponding to the search term and the one or more autocomplete search terms 119 on the search entry area 115.

A method of providing the recommendation content through the search entry area 115 is further described with reference to FIG. 7.

The description related to technical features made above with reference to FIGS. 1 and 2 may apply to FIG. 3 and further description is omitted.

Hereinafter, a method of sharing search results selected by the user from the search results 118 displayed on the search entry area 115 through the chatroom is described with reference to FIGS. 4 and 5.

Figure 4:
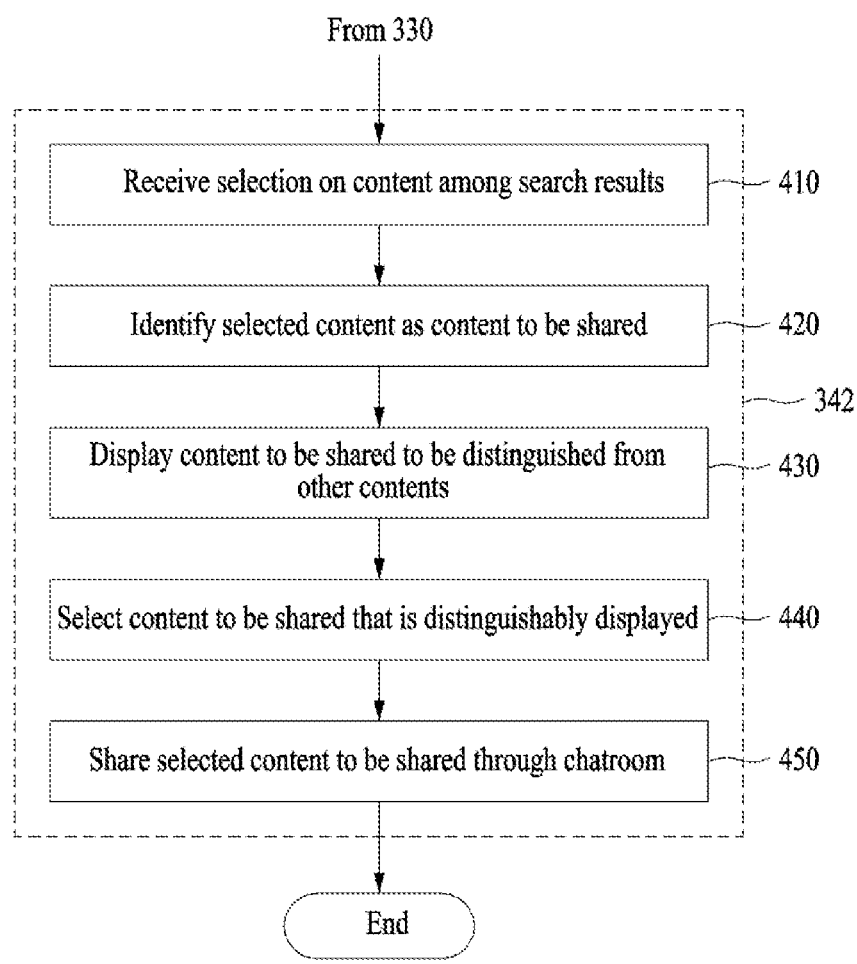
FIG. 4 is a flowchart illustrating an example of a method of sharing search results displayed on a search entry area in a chatroom according to at least one example embodiment.

FIG. 4 is a flowchart illustrating an example of a method of sharing search results displayed on a search entry area in a chatroom according to at least one example embodiment. FIG. 5 illustrates an example of a method of sharing search results displayed on a search entry area in a chatroom according to at least one example embodiment. FIG. 5 may represent the screen of the messenger application executed in the computer system 110.

In operation 410, the computer system 110 may receive a selection on at least one content among the search results 118 corresponding to a search term that is input on the first area 117, for example. For example, the user may select (e.g., touch) at least one image the user desires to share through the chatroom among the one or more images (e.g., thumbnails) displayed as the search results 118.

In operation 420, the computer system 110 may identify the selected content as content to be shared 510. The server 150 may identify that the selected content is the content to be shared 510 through communication with the computer system 110.

In operation 430, the computer system 110 may display the content to be shared 510 to be distinguished from other contents among the search results 118 corresponding to the search term. That is, the content to be shared 510 and other contents included in the search results 118 may be visually distinguished. For example, the content to be shared 510 may be displayed darker than other contents. Alternatively or additionally, the content to be shared 510 may be displayed including an indicator 520. For example, the indicator 520 may be an image in a form of a paper airplane. The user may easily identify the content to be shared 510 through the indicator 520.

In operation 440, the computer system 110 may receive a selection on the content to be shared 510 that is distinguishably displayed. For example, the user may select the content to be shared 510 by touching the content to be shared 510 and/or by touching the indicator 520.

In operation 450, in response to receiving a selection on the content to be shared 510 that is distinguishably displayed, the computer system 110 may share the selected content to be shared 510 through the chatroom.

An example of shared content 530 through the chatroom is illustrated in FIG. 5.

For example, in an example embodiment, the user of the computer system 110 may touch an image the user desires to share among images included in the search results 118 displayed on the search entry area 115, and the touched image may be identified as the content to be shared 510 and displayed to be visually distinguishable. The user may share the content to be shared 510 through the chatroom by touching the content to be shared 510 once more or the indicator 520. The shared image 530 may be displayed in a form of a message in the chatroom.

The description related to technical features made above with reference to FIGS. 1 and 3 may apply to FIGS. 4 and 5, and further description is omitted.

Figure 6:
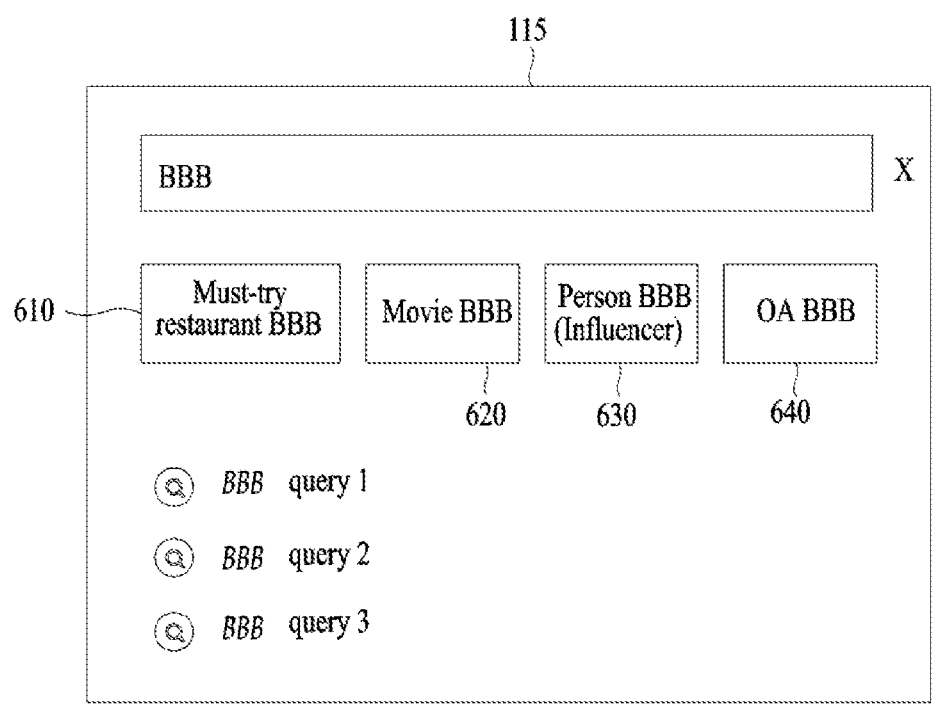
FIGS. 6 to 8 illustrate examples of a method of displaying search results and content on a search entry area according to at least one example embodiment.
Figure 7:
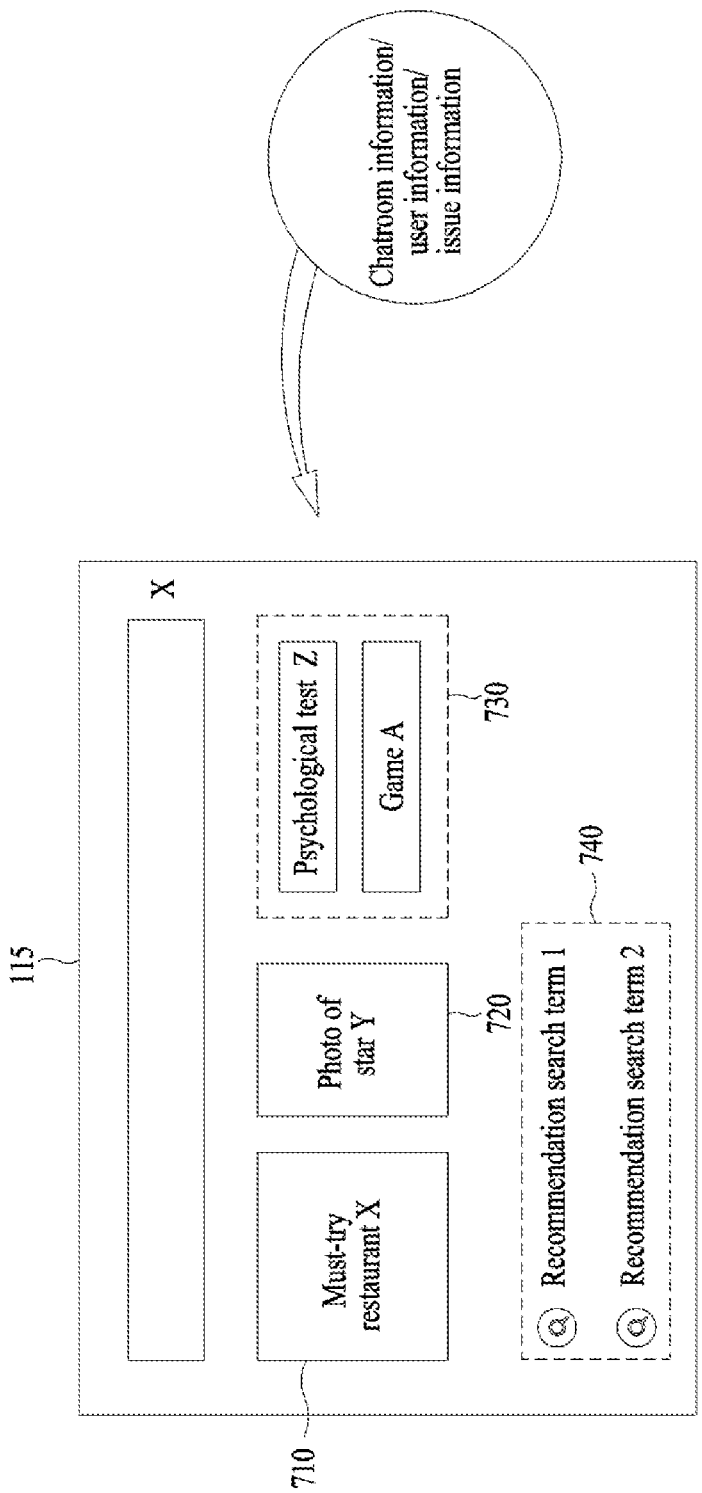
Figure 8:
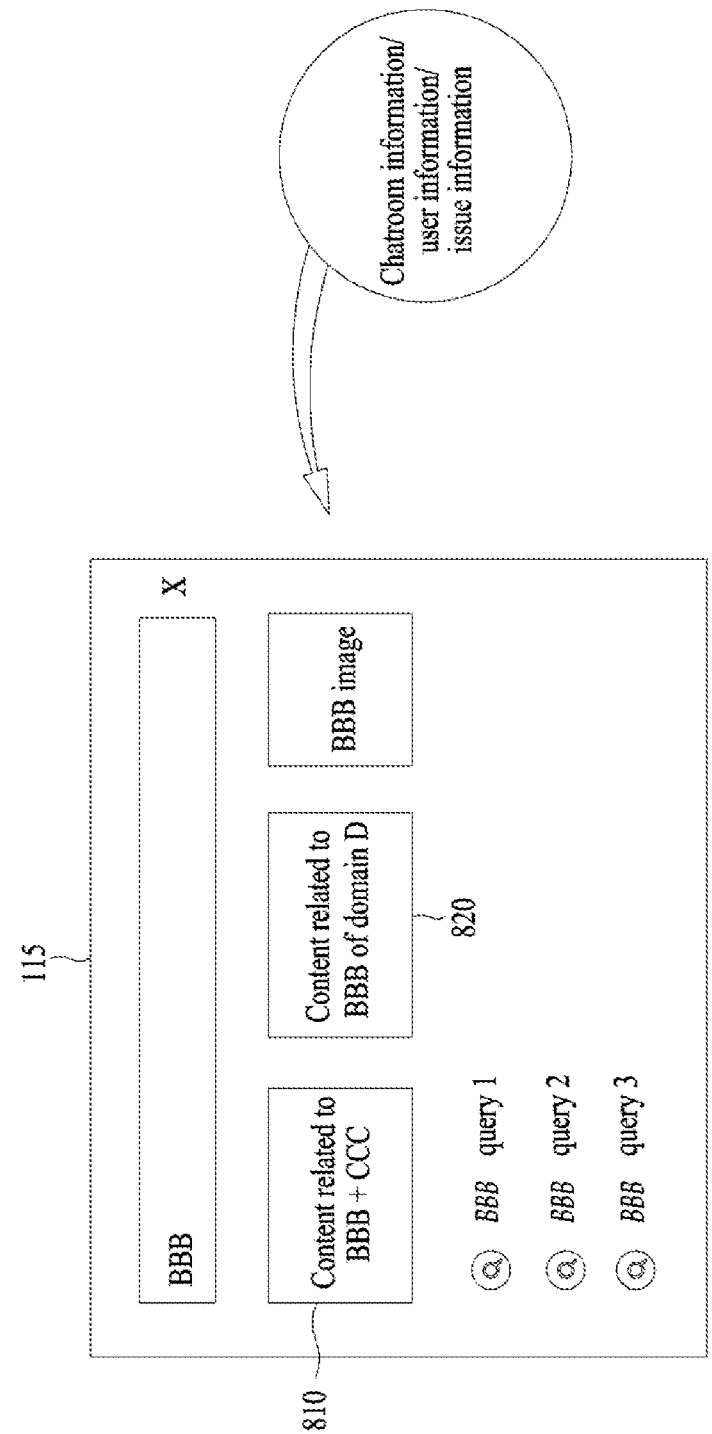

FIGS. 6, 7, and 8 illustrate examples of a method of displaying search results and content on a search entry area according to at least one example embodiment.

As described above, the search results 118 corresponding to the search term provided through the search entry area 115 may be provided from the server 150.

Search results for a search term that is input to the server 150 providing the search service and/or an autocomplete search term of the corresponding search term may be modeled. That is, the search term and the search results corresponding to the search term may be indexed in the server 150. The search term indexed with the search results may be a combination of keywords. A database related to the server 150 may store information about search results that map or index for each of search terms.

The server 150 may provide at least a portion of the modeled search results to the computer system 110 as search results to be displayed on the search entry area 115. For example, the search results 118 corresponding to the search term displayed on the search entry area 115 may correspond to a preview of a portion of the search results modeled for the corresponding search term.

As described above, the search results 118 corresponding to the search term input through the first area 117 may include modeled search results as search results for the corresponding search term or the autocomplete search term of the search term in the server 150 that provides the search service.

In relation thereto, FIG. 6 illustrates an example of a method of displaying contents 610 to 640 (i.e., content 610, content 620, content 630, and content 640) as the search results 118 corresponding to the modeled search results, for example, and an autocomplete search term of the input search term on the search entry area 115.

Referring to FIG. 6, the search results 118 corresponding to an input search term "BBB" may include at least one linkage with a variety of messenger service information, for example, must-try restaurant information 610 as place information, movie information 620, person information 630 (influencer information), and official account information 640. The search results 118 corresponding to a specific category among a plurality of categories (or domains) or the search results 118 corresponding to at least two categories (or domains) may be displayed on the search entry area 115.

A category of the search results 118 displayed on the search entry area 115 may be determined based on an attribute of the input search term and/or information related to the chatroom.

For example, in relation to an attribute of the search term, when the search term includes a keyword representing a specific category such as "image" or "video," the search results 118 corresponding to the specific category may be displayed on the search entry area 115. Alternatively or additionally, when the input search term has an ambiguous meaning, the server 150 may determine a meaning of the input search term by referring to a search term input history (e.g., as a meaning corresponding to search results more frequently selected) and may display the search results related to the corresponding meaning (e.g., movie title, place name, person name, company name) on the search entry area 115 as the search results 118 corresponding to the search term.

In relation to information related to the chatroom, the search results 118 corresponding to the search term may include search results that further consider information related to the chatroom as the search results for the search term or an autocomplete search term thereof. In some embodiments, the chatroom may refer to a chatroom in which the search service is executed. The information related to the chatroom may include at least one of a topic of the chatroom, a keyword determined based on messages sent and/or received in the chatroom, and a location of a user included in the chatroom.

When the chatroom is an open chatroom or a group chatroom, the topic of the chatroom may be set by a chatroom creator when creating the chatroom. Alternatively or additionally, the topic of the chatroom may be determined from a title of the chatroom or may be determined by analyzing keywords included in messages sent and/or received in the chatroom. For example, if messages sent and/or received in the chatroom relate to "singer A," the topic of the chatroom may be determined as "singer A." In some embodiments, the topic of the chatroom may be determined by the server 150. The search results 118 displayed on the search entry area 115 may further apply the topic of the chatroom. For example, when the input search term is "A image" and the topic of the chatroom is a singer A, the search results 118 displayed on the search entry area 115 may include an image of the singer A. Alternatively or additionally, when a message sent and/or received in the chatroom relates to "sports," for example, "baseball," a topic of the corresponding chatroom may be determined as "baseball." In such an example, a live view screen relayed at a specific point in time may be provided in the search results 118 displayed on the search entry area 115.

Alternatively or additionally, the search results 118 displayed on the search entry area 115 may further apply a keyword that is determined based on messages sent and/or received in the chatroom. For example, if a determination is made that discussion about a singer or music is being made in the chatroom as a result of analyzing frequency of keywords included in messages sent and/or received in the chatroom, and when the input search term is "A image," the search results 118 may include an image of the singer A. Alternatively or additionally, the search results 118 may apply the content of a message sent or received just before executing the search service. For example, when a message sent or received just before executing the search service relates to "must-try restaurant," information about a restaurant related to the input search term (i.e., must-try restaurant information) may be provided as the search results 118.

Alternatively or additionally, the search results 118 displayed on the search entry area 115 may further apply a location of a user included in the chatroom. For example, when the location of the user included in the chatroom (e.g., a user executing the search service) is "Gangnam-gu," and when the input search term is "A," information about a location (a must-try restaurant) present in Gangnam-gu may be provided as the search results 118. That is, place information within an administrative district (or other geographical region) in which the user is present may be provided as the search results 118. Alternatively or additionally, information about a place A (a must-try restaurant) present around the location of the user may be provided as the search results 118.

Alternatively or additionally, the search results 118 displayed on the search entry area 115 may further apply information of the user executing the search service. Information of the user may include at least one of matter of interest information of the user that is preset by the user and/or verified from a search term input history and a search result selection history of the user, age information of the user, and/or location information of the user. As such, the search results 118 having a relatively high relevance with the user executing the search service may be provided through the search entry area 115.

Alternatively or additionally, the search results 118 displayed on the search entry area 115 may further apply issue information in the search service. For example, the issue information may include a topic that is currently an issue in the search service. The issue information may be determined based on search terms input from users and/or search results selected by the users for the search service for a predetermined (and/or desired) period. Alternatively or additionally, the issue information may be determined based on news, for example, breaking news and/or most viewed news. Alternatively or additionally, the issue information may be determined based on a rapidly rising search term, a hot topic keyword, and the like. As such, the search results 118 in which a current issue is well applied may be provided through the search entry area 115.

In some embodiments, the search results 118, for example, search results modeled by the server 150, displayed on the search entry area 115 may include search results for a search term that is a combination of the search term input through the first area 117 or the autocomplete search term thereof and another search term. The another search term may not be a search term input from the user of the computer system 110 and may be a search term that is alternatively or additionally considered in providing the search results 118 by the server 150.

The another search term may be determined based on a search term input history of another search term input from the user (e.g., the user of the computer system 110 and/or other users using the search service) for the search service with the corresponding search term or the autocomplete search term thereof. For example, a search term with an input history (or input with a predetermined and/or desired frequency or more) by the user of the computer system 110 may be determined as the another search term. Alternatively or additionally, a search term having a high input frequency (or input with a predetermined and/or desired frequency or more) in combination with a search term by other users may be determined as the another search term. For example, when "AAA" is input as a search term as a result of analyzing the search term input history and when "singer" is input together at a great frequency, the server 150 may determine "singer" as the another search term and may display search results for "AAA singer" on the search entry area 115, even if only "AAA" is input as the search term.

Alternatively or additionally, the another search term may be determined based on news (e.g., breaking news and most viewed news) related to the input search term or the autocomplete search term thereof or issue information provided in the search service. The aforementioned description may similarly apply to the issue information and thus, further description is omitted. For example, the server 150 may analyze news and/or issue information in association with the input search term "AAA" and may determine a keyword such as "romance rumor" as the another search term. In some embodiments, if only "AAA" is input as the search term, the server 150 may display search results for "AAA romance rumor" on the search entry area 115. Alternatively or additionally, the another search term may be determined based on search terms input from the other users to search for news related to the input search term.

Alternatively or additionally, the another search term may be determined based on information related to the chatroom. In some embodiments, the chatroom may represent a chatroom in which the search service is executed. The information related to the chatroom may include at least one of a topic of the chatroom, a keyword that is determined based on messages sent and/or received in the chatroom, and a location of a user included in the chatroom. The aforementioned description may similarly apply to the information related to the chatroom and, thus, further description is omitted. For example, the another search term may be determined as a recommendation keyword that is determined based on information related to the chatroom, a keyword used with a predetermined (and/or desired) frequency or more in messages sent and/or received in the chatroom, a keyword included in a message sent and/or received just before the search service is executed, and a keyword that represents the topic of the keyword.

Alternatively or additionally, the another search term may be determined based on information of the user that executes the search service. The aforementioned description may similarly apply to information of the user and, thus, further description is omitted.

In relation thereto, FIG. 8 illustrates an example of a method of providing search results (e.g., contents 810 and 820) for a search term that is a combination of a search term input through the first area 117 and another search term through the search entry area 115.

Referring to FIG. 8, the search results 118 corresponding to an input search term "BBB" may include, for example, the content 810 in which another search term CCC is considered together. For example, another search term combined with "BBB" may be "CCC." In such an example, the content 810 may be an image that includes both a person "BBB" and a person "CCC," for example, a person that is determined to be related to "BBB" based on news or issue information.

Also, the search results 118 corresponding to the input search term "BBB" may include the content 820 related to "BBB" of a specific domain "D." As such, the another search term combined with "BBB" may be "(category or domain) D."

Therefore, in an example embodiment, the search results 118 in which information of a user, a chatroom, or a current issue is further applied may be provided through the search entry area 115.

In the following, the aforementioned method of providing recommendation content through the search entry area 115 in operation 315 is further described with reference to FIG. 7.

As described above, the computer system 110 may display recommendation content on the search entry area 115 after the search service is executed and before a search term is input for the search service.

The recommendation content may be determined based on a keyword that is determined based on at least one of a topic of the chatroom, messages sent and/or received in the chatroom, and a location of a user included in the chatroom. The aforementioned description may similarly apply to information related to the chatroom and thus, further description is omitted.

Alternatively or additionally, the recommendation content may be determined based on the aforementioned issue information and/or information of the user. The aforementioned description may similarly apply to the issue information and information of the user and thus, further description is omitted.

For example, the recommendation content displayed on the search entry area 115 may include at least one of place information (e.g., must-try restaurant information 710) about a place that is determined based on a location of a user included in the chatroom (e.g., a user that executes the search service), a recommendation search term (e.g., a recommendation search term 740) that is determined based on a keyword determined based on messages sent and/or received in the chatroom, and a recommendation search term that is determined based on a topic of the chatroom. The recommendation search term 740 may include a predetermined (and/or desired) number of search terms or hot issue search terms that rank top among real-time search terms in the search service.

For example, the recommendation content may include information about a place around the verified location of the user (e.g., must-try restaurant information) or a recommendation search term related to the corresponding place. A place to be recommended may be determined by the server 150 and may be a place that is mentioned or shared by users with a predetermined (and/or desired) frequency or more through the messenger application or may be a place mentioned in TV programs.

Alternatively or additionally, the recommendation content may include content 720 that includes information about current news or issues.

Alternatively or additionally, the recommendation content may include person information related to a user (e.g., friend information) or influencer information as person information based on matter of interest information of the user. The person information may include content provided through social media accounts and/or Internet content (e.g., Instagram, blogs, mini-homepage, Facebook, Simple Notification Service (SNS), YouTube, and the like) of the corresponding person.

Alternatively or additionally, the recommendation content may include participating content 730 that allows participation of at least one user included in the chatroom (e.g., a user that executes the search service). The participating content 730 may include game content that allows play of the at least one user, a survey that allows participation of the at least one user, and test content (e.g., a psychological test) that allows participation of the at least one user.

The participating content 730 may be executed in the chatroom or a popup window overlaid on the chatroom by the computer system 110 according to a selection of the user.

That is, according to an example embodiment, in a state in which a search service is executed and a search term is not input, suitable recommendation content may be provided through the search entry area 115. The user may obtain a hint about the search term through the recommendation content, may easily verify current news or issues, or may find things to enjoy in the chatroom through the participating content 730.

The description related to technical features made above with reference to FIGS. 1 to 5 may apply to FIGS. 6 to 8 and further description is omitted.

The apparatuses described herein may be implemented using hardware components, software components, and/or a combination thereof. For example, the apparatuses and the components described herein may be implemented using one or more general-purpose or special purpose computers, such as, for example, a processor, a controller, an ALU, a DSP, a microcomputer, an FPGA, a programmable logic unit (PLU), a microprocessor, or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A method of providing a search service, implemented by a computer system, the method comprising:
   executing the search service provided through a chatroom associated with a messenger application, wherein the chatroom is to exchange messages among a plurality of users;
   based on a first search term input for the search service, displaying, on a search entry area, first search results corresponding to the first search term and at least one autocomplete search term of the first search term;
   sharing, through the chatroom, the first search results with the plurality of users; and
   storing, in a database, information about the first search results indexed to the first search term and the at least one autocomplete search term of the first search term,
   wherein the at least one autocomplete search term of the first search term is determined based on determining whether a quantity of search term input history of a user for the search service meets or exceeds a predetermined amount,
   wherein the first search results are related to a topic determined for the chatroom and filtered search results from among first search results of the first search term,
   wherein the topic for the chatroom is determined based on at least one of i) an initial topic set at creation of the chatroom, ii) a title of chatroom, or iii) analysis of keywords included in messages transmitted in the chatroom,
   wherein the search entry area comprises a first area for inputting the first search term and a second area for displaying the first search results and the at least one autocomplete search term,
   wherein the displaying of the first search results and the at least one autocomplete search term comprises:
      displaying the first search results and the at least one autocomplete search term on the second area concurrently with the first search term being input by the user is displayed on the first area, without receiving, from the user, a search request for outputting the first search results;
      determining that the user has modified the first search term being input by the user on the first area, without receiving a separate search request from the user; and
      updating, based on the modified first search term, the first search results and the at least one autocomplete search term displayed on the second area in response to determining that the user has modified the first search term,
      wherein the updating of the first search results and the at least one autocomplete search term is performed without transmitting the first search term to the chatroom, and
      wherein the displaying of the at least one autocomplete search term on the second area comprises displaying a first portion of the at least one autocomplete search term that matches the first search term and a second portion of the at least one autocomplete search term that does not match the first search term such that the first portion and the second portion are distinguishable from each other.

2. The method of claim 1, wherein the search entry area is displayed as an overlay over the chatroom according to execution of the search service.

3. The method of claim 1, wherein the displaying of the first search results and the at least one autocomplete search term comprises displaying the first search results corresponding to the first search term and the at least one autocomplete search term on the search entry area without receiving, from the user, a search request for displaying the first search results after the first search term being input, and
   a subset of the first search results corresponding to the first search term includes a third portion corresponding to the first search term or a fourth portion corresponding to a first autocomplete search term of the first search term.

4. The method of claim 3, wherein, when the first search term corresponds to an incomplete query, the displaying of the first search results and the at least one autocomplete search term comprises displaying, on the search entry area, the at least one autocomplete search term and the second portion corresponding to the first autocomplete search term.

5. The method of claim 1, wherein a third portion of the first search results corresponding to the first search term includes at least one of an image related to the first search term, a video related to the first search term, movie information related to the first search term, television (TV) program information related to the first search term, place information related to the first search term, official account information related to the first search term, and person information related to the first search term.

6. The method of claim 1, further comprising:
   sharing, through the chatroom, one or more search results selected from a third portion of the first search results corresponding to the first search term displayed on the search entry area.

7. The method of claim 6, wherein the sharing of the one or more search results comprises:
   receiving a first selection of at least one content from the third portion of the first search results corresponding to the first search term;
   identifying the at least one content as content to be shared;
   displaying the content to be shared to be distinguished from other contents among the third portion of the first search results corresponding to the first search term; and
   based on receiving a second selection of the content to be shared that is distinguishably displayed, sharing second content indicated by the second selection through the chatroom.

8. The method of claim 1, wherein the displaying of the first search results and the at least one autocomplete search term comprises, based on a change in the first search term input for the search service resulting in a second search term, displaying, on the search entry area, second search results corresponding to the second search term and a second autocomplete search term of the second search term.

9. The method of claim 1, further comprising:
based on receiving a selection of the at least one autocomplete search term displayed on the search entry area, providing second search results corresponding to the selection.

10. The method of claim 1, wherein the first search results corresponding to the first search term include first modeled search results corresponding to the first search term or second modeled search results corresponding to the at least one autocomplete search term, the first modeled search results and the second modeled search results having been generated at a server that provides the search service.

11. The method of claim 10, wherein the first modeled search results or the second modeled search results include second search results corresponding to a second search term that is a combination of the first search term or the at least one autocomplete search term of the first search term and a third search term, and
the third search term is determined based on at least one of:
a search term input history of another search term input from the user for the search service with the first search term or the at least one autocomplete search term,
news related to at least one of the first search term, the at least one autocomplete search term, and issue information provided from the search service, and
information related to the chatroom.

12. The method of claim 1, wherein a third portion of the first search results corresponding to the first search term include second search results that correspond to information related to the chatroom, and
the information related to the chatroom includes at least one of the topic of the chatroom, a keyword that is determined based on a first message sent in the chatroom or a second message received in the chatroom, and a location of another user included in the chatroom.

13. The method of claim 1, further comprising:
displaying recommendation content on the search entry area after the search service is executed and before the first search term is input for the search service,
wherein the displaying of the first search results and the at least one autocomplete search term comprises, based on the first search term being input for the search service, displaying the first search results corresponding to the first search term and the at least one autocomplete search term on the search entry area, and stopping the displaying of the recommendation content.

14. The method of claim 13, wherein the recommendation content is determined based on information related to the chatroom including at least one of the topic of the chatroom, a keyword that is determined based on a first message sent in the chatroom or a second message received in the chatroom, and a location of another user included in the chatroom, and
the recommendation content includes at least one of place information about a place that is determined based on the location of the another user included in the chatroom, a first recommendation search term that is determined based on the keyword, and a second recommendation search term that is determined based on the topic of the chatroom.

15. The method of claim 13, wherein the recommendation content includes participating content that allows participation of at least one user included in the chatroom, and
the participating content includes game content that allows play of the at least one user, a survey that allows participation of the at least one user, and test content that allows participation of the at least one user.

16. The method of claim 1, wherein a third portion of the first search results corresponding to the first search term include second search results of a type preset for a category to which the first search term belongs.

17. A non-transitory computer-readable storage medium storing a program that, when executed by at least one processor of the computer system, causes the computer system to perform the method of claim 1.

18. A computer system comprising:
a memory storing instructions; and
at least one processor communicatively coupled to the memory, wherein the at least one processor is configured to execute the instructions to:
execute a search service provided through a chatroom associated with a messenger application, wherein the chatroom is to exchange messages among a plurality of users;
based on a search term input for the search service, display on a search entry area, search results corresponding to the search term and at least one autocomplete search term of the search term;
share, through the chatroom, the search results with the plurality of users; and
store, in a database, information about the search results indexed to the search term and the at least one autocomplete search term of the search term,
wherein the at least one autocomplete search term of the search term is determined based on determining whether a quantity of search term input history of a user for the search service meets or exceeds a predetermined amount,
wherein the search results are related to a topic determined for the chatroom and filtered search results from among the search results of the search term,
wherein the topic for the chatroom is determined based on at least one of i) an initial topic set at creation of the chatroom, ii) a title of chatroom, or iii) analysis of keywords included in messages transmitted in the chatroom,
wherein the search entry area comprises a first area for inputting the search term and a second area for displaying the search results and the at least one autocomplete search term,
wherein the display of the search results and the at least one autocomplete search term comprises to:
display the search results and the at least one autocomplete search term on the second area concurrently with the search term being input by the user is displayed on the first area, without receiving, from the user, a search request for outputting the search results;
determine that the user has modified the search term being input by the user on the first area, without having received a separate search request from the user; and
update, based on the modified search term, the search results and the at least one autocomplete search term displayed on the second area in response to a determination that the user has modified the search term,
wherein the update of the search results and the at least one autocomplete search term is performed without transmitting the search term to the chatroom, and wherein the display of the at least one autocomplete search term on the second area comprises to display a first portion of the at least one autocomplete search term that matches the search term and a second portion of the at least one autocomplete search term that does not match the search term such that the first portion and the second portion are distinguishable from each other.

19. A method of providing a search service, performed by a server that provides the search service through a chatroom associated with a messenger application, the method comprising:

based on a request from a user terminal through the chatroom, providing the search service to the user terminal in association with the chatroom, wherein the chatroom is to exchange messages among a plurality of users;

based on a search term input for the search service from the user terminal, providing search results corresponding to the search term and at least one autocomplete search term of the search term to the user terminal, and causing the search results corresponding to the search term and the at least one autocomplete search term to be displayed on an search entry area;

sharing, through the chatroom, the search results with the plurality of users; and storing, in a database, information about the search results indexed to the search term and the at least one autocomplete search term of the search term, wherein the at least one autocomplete search term of the search term is determined based on determining whether a quantity of search term input history of a user for the search service meets or exceeds a predetermined amount, wherein the search results are related to a topic determined for the chatroom and filtered search results from among the search results of the search term, wherein the topic for the chatroom is determined based on at least one of i) an initial topic set at creation of the chatroom, ii) a title of chatroom, or iii) analysis of keywords included in messages transmitted in the chatroom, wherein the search entry area comprises a first area for inputting the search term and a second area for displaying the search results and the at least one autocomplete search term, wherein the displaying of the search results and the at least one autocomplete search term comprises:

displaying the search results and the at least one autocomplete search term on the second area concurrently with the search term being input by the user is displayed on the first area, without receiving, from the user, a search request for outputting the search results;

determining that the user has modified the search term being input by the user on the first area, without receiving a separate search request from the user; and updating, based on the modified search term, the search results and the at least one autocomplete search term displayed on the second area in response to determining that the user has modified the search term, wherein the updating of the search results and the at least one autocomplete search term is performed without transmitting the search term to the chatroom, and wherein the displaying of the at least one autocomplete search term on the second area comprises displaying a first portion of the at least one autocomplete search term that matches the search term and a second portion of the at least one autocomplete search term that does not match the search term such that the first portion and the second portion are distinguishable from each other.

20. The method of claim 19, wherein the providing of the search results corresponding to the search term and the at least one autocomplete search term comprises providing the search results corresponding to the search term and the at least one autocomplete search term to the user terminal without receiving, from the user terminal, a search request for displaying the search results after the search term being input, and a subset of the search results corresponding to the search term include a third portion corresponding to the search term or a fourth portion corresponding to a first autocomplete search term of the search term.

21. The method of claim 19, wherein the providing of the search results corresponding to the search term and the at least one autocomplete search term comprises, based on a change in the search term input for the search service from the user terminal resulting in a changed search term, providing updated search results corresponding to the changed search term and at least one updated autocomplete search term of the changed search term to the user terminal.

* * * * *